United States Patent [19]

Bouhours

[11] Patent Number: 4,889,326
[45] Date of Patent: Dec. 26, 1989

[54] HYDRAULIC ANTIVIBRATORY SUPPORTS

[75] Inventor: Jean-Paul Bouhours, Arrou, France

[73] Assignee: Hutchinson, Paris, France

[21] Appl. No.: 211,932

[22] Filed: Jun. 27, 1988

[30] Foreign Application Priority Data

Jul. 1, 1987 [FR] France ............... 87 09320

[51] Int. Cl.⁴ ............... F16F 15/04; F16M 13/00
[52] U.S. Cl. ............... 267/140.1; 248/562
[58] Field of Search ............... 267/35, 140.1, 219,
267/136, 140.1 A, 140.1 AE, 140.1 E; 188/378,
299; 180/300, 312; 248/550, 559, 562, 566, 636,
638; 251/251, 257, 259

[56] References Cited

U.S. PATENT DOCUMENTS

| | | | |
|---|---|---|---|
| 4,583,503 | 4/1986 | Kumagai et al. | 248/636 X |
| 4,650,170 | 3/1987 | Fukushima | 267/219 X |
| 4,770,392 | 9/1988 | Schmidt | 251/251 X |

FOREIGN PATENT DOCUMENTS 0288741 12/1987 Japan ............... 267/219

Primary Examiner—Robert J. Oberleitner
Attorney, Agent, or Firm—Larson and Taylor

[57] ABSTRACT

In an antivibratory support interposed between two rigid elements (1-3 and 4-5) and comprising a work chamber (A) and a compensation chamber (B) separated by a dividing wall (8) with a mobile valve (10) and connected together by a restricted passage (9), a rotary cam (13) is provided immersed in the work chamber and serving as end of travel stop for the valve, the rotational movements of this cam being controllable from outside the support by means of a rod (14) passing sealingly through the dividing wall of the chamber. The cam is coupled to a a member (19) for controlling the opening of a second restricted passage (18).

4 Claims, 1 Drawing Sheet

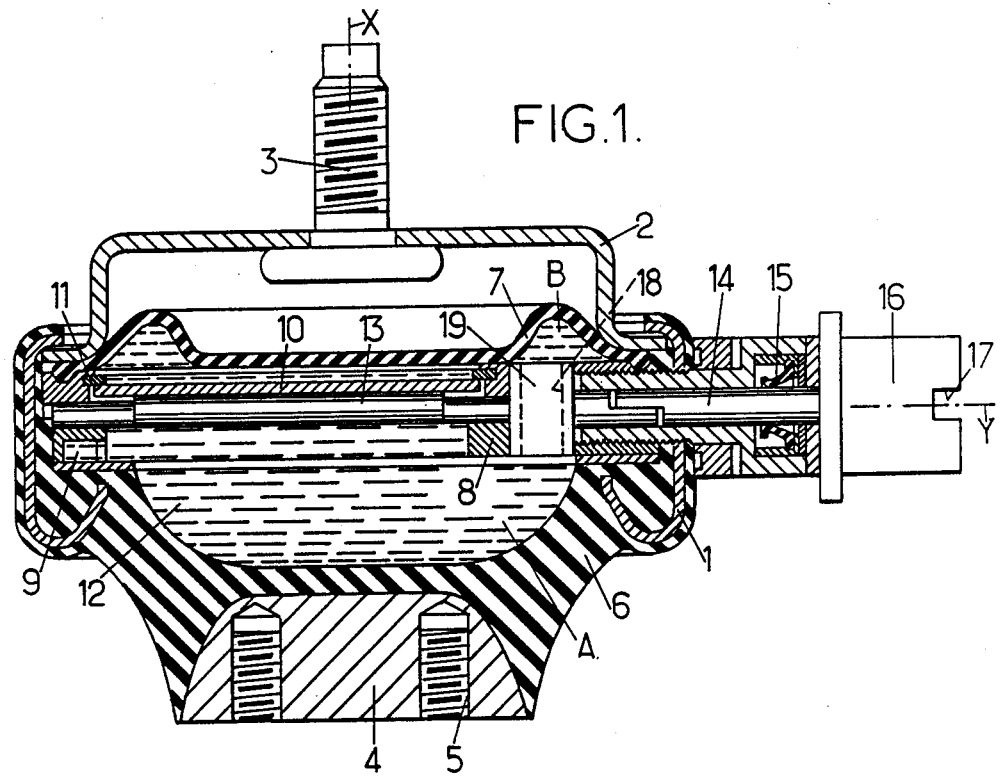
FIG.1.
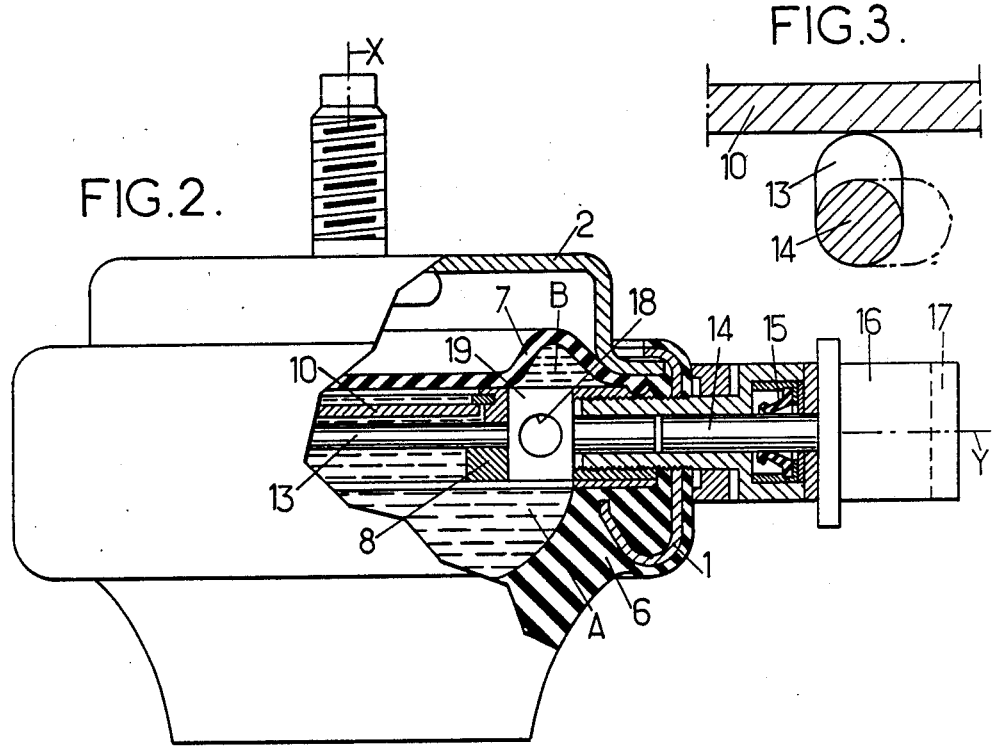
FIG.2.
FIG.3.

HYDRAULIC ANTIVIBRATORY SUPPORTS

FIELD OF THE INVENTION

The invention relates to antivibratory supports to be placed, for support and damping purposes, between two rigid elements individually subjected to certain oscillations and/or vibrations, the damping, at least under certain operating conditions, comprising the driving of a liquid through a restricted passage.

By way of non limitative example, such supports may be mounted between a vehicle chassis and the internal combustion engine of this vehicle for damping not only the "hash" oscillations imposed on the chassis by the unevennesss and gradient variations of the ground when the vehicle is travelling over such ground, but also vibrations due to the operation of the engine, particularly when idling or else when shocks are applied to this engine during starting up and stopping by respectively the first and last explosions.

SUMMARY OF THE INVENTION

The invention relates more particularly, among the supports of the kind in question, to those which are formed by a sealed case interposed between the two rigid elements. The case comprises a rigid base fixable to one of the two rigid elements, a rigid ring fixable to the other rigid element, a resilient annular support wall sealingly connecting the base to the ring and a flexible membrane connected sealingly to the ring. The inside of this case is divided by a tight dividing wall connected to the ring between the annular wall and the membrane, into two chambers, namely a work chamber on the annular wall side and a compensation chamber on the membrane side. These two chambers communicate together permanently through the above restricted passage, which is advantageously formed by a curved channel situated in the connection zone between the annular wall and the ring. A liquid mass fills the two chambers as well as the restricted passage.

The invention relates more particularly still to the case where the intermediate sealed dividing wall comprises a deformable or mobile portion forming a floating "valve" and two mechanical stops surrounding this valve axially so as to limit the amplitude of its free movements to a low value, preferably less than 0.5 mm.

With such a support, the oscillations or vibrations created between the two rigid elements result in moving these two elements towards or away from each other axially in turn.

Those of these oscillations, called "hash" or "chopping" motions, which have a relatively low frequency (less than 20 Hz) and a relatively high amplitude (greater than 0.5 mm) result in driving the liquid from one of the two chambers into the other through the restricted passage and conversely. For a given value of said frequency depending essentially on the dimensions of said passage, high damping of the oscillations considered can be observed due to a resonating effect of the liquid mass flowing through this passage.

Those of said oscillations which have a relatively high frequency (greater than 20 Hz) and a relatively low amplitude (less than 0.5 mm) cause corresponding oscillations of the valve without there being a true transfer of liquid through the restricted passage, which results in filtering the transmission of the oscillations considered of the rigid element where they are generated to the other rigid element.

The role which has just been mentioned of the valve is dangerous for certain situations, but it may happen that under other circumstances this valve is the seat of undesirable transient vibrations.

This is the case for example during starting or stopping of the engine of some vehicles, in which there is a danger of "clacking" of the value. This is a sudden movement with the production of an intense sound, if it is not blocked.

To overcome or at least to attenuate such undesirable vibrations, it has already been proposed to temporarily limit the amplitude of the free movement of the valve by adjusting the axial position of one of the two stops which surround it axially and against which it abuts during each alteration of its free movements.

These adjustments are generally controlled by means of electromagnets which involves a construction, at least partial, from magnetic material of the stop to be moved.

A mechanical solution has also been suggested, the adjustment then being carried out on a cylindrical body fast with the stop to be moved and passing axially through the membrane. This solution is difficult to put into practice for the adjustments require axial movements of the membrane; in addition, the cylindrical body divides the compensation chamber into two separate coaxial compartments which behave differently during operation of the support.

The purpose of the invention is, among other things, to overcome these drawbacks.

For this, the supports of the kind in question in accordance with the invention further include mechanical means for adjusting the amplitude of the range of movement of the valve and these means are essentially characterized in that they comprise:

a rotary cam immersed in one of the two chambers of the support and forming by itself one of the two stops which define the range of movement of the valve, the amplitudes of these movements varying then from a maximum value to a minimum value, possibly zero, as a function of the angular positions of the cam about its offcentered rotational axis, which axis is oriented in a direction perpendicular to the direction of movement of the valve, a rod fast with the cam and passing through the wall of said chamber through a seal, and means external to the support for controlling the rotation of the rod.

In advantageous embodiments, recourse is further had to one and/or other of the following arrangements:

the chamber in which the cam is immersed is the work chamber of the support, the cam has the external form of a cylinder offcentered with respect to its axis of rotation, the support comprises a second restricted passage joining the two chambers together and preferably formed in the rigid seat of the valve and a rotary member adapted for adjustably closing this second passage and coupled to the above rotary cam so that maximum blocking of the valve corresponds to opening of the second passage and so that maximum unblocking of this valve corresponds to closure of this second passage.

Apart from these main arrangements the invention comprises certain other arrangements which are preferably used at the same time and which will be more explicitly discussed hereinafter.

BRIEF DESCRIPTION OF THE DRAWINGS

In what follows, a preferred embodiment of the invention will be described with reference to the accompanying drawings in a way which is of course in no wise limitative.

FIGS. 1 and 2 of these drawings show in axial section an antivibratory support constructed in accordance with the invention, in its two conditions corresponding respectively to maximum blocking and unblocking of the valve.

FIG. 3 is a partial section on a larger scale of the rotary cam of support.

DETAILED DESCRIPTION OF THE PREFERRED EMBODIMENT

The support considered is intended to be interposed vertically or in a direction slightly slanted from the vertical between a rigid carrier member formed by a vehicle chassis and a rigid supported member formed by an internal combustion engine.

The terms "top, bottom, upper, lower, dish" are used in the following description by way of non-limitative example, for the support described may be perfectly well used upside down with respect to the direction adopted for this description.

The support has the general form of a sealed case of revolution about an axis X comprising:
a rigid ring 1 extending horizontally and outwardly the edge of an upturned metal dish 2, itself capable of supporting the engine of a vehicle by means of a stud bolt 3 whose threaded shank, extending upwardly, passes through the center of said dish,
a lower base 4 formed by blind threaded holes 5 opening downwardly and adapted for receiving bolts for fixing this base to the chassis of the vehicle,
a sufficiently thick resilient annular wall 6 for transmitting the loads of the engine to the chassis, which wall is defined essentially by two upwardly widening truncated cone shaped surfaces whose small base, disposed at the bottom, is adhered to base 4, its large base being connected sealingly to the ring 1,
and an upper tight and flexible membrane 7 contained inside dish 2, the edge of this membrane being sealingly fixed to ring 1.

An intermediate dividing wall 8 divides the inside of the case thus formed into two chambers, namely a lower work chamber A and an upper compensation or balancing chamber B.

The periphery of the dividing wall 8 is for this purpose sealingly connected to ring 1, between the thick wall 6 and membrane 7.

A restricted passage 9 causes the two chambers A and B to communicate permanently together.

This passage 9 is here formed by at least one curved channel extending along an arc of a circle about axis X, which channel is formed in the periphery of the dividing wall 8.

The central portion of the intermediate dividing wall 8 is formed by a rigid valve-forming disk 10.

This valve is mounted "floating" so as to be able to move in the direction of axis X between two rigid stops one of which is formed by a blocking washer 11 housed in a complementary groove of dividing wall 8.

A liquid mass 12 fills the chambers A and B as well as channel 9 and valve 10 is immersed in this liquid mass.

As is well known, the existence of this valve 10 damps the transmission of certain undesirable vibrations from one of the rigid elements to the other, because of the range of movement then imposed on said valve of these undesirable vibrations.

The invention proposes reducing, even cancelling out, the amplitude of the range of movement of this valve in certain other situations in which these movements are themselves undesirable.

For this, a rotary eccentric cam 13 is immersed in the support, preferably in its chamber A. The fixed axis of rotation Y of this cam intersects axis X and extends perpendicularly to this axis in a diametrical direction of the support.

Said cam 13 is adapted so that:
for one of its angular positions (shown in FIG. 1 and with continuous lines in FIG. 3), cam 13 comes into contact with the valve 10 all along one of the diameters of valve 10 while the periphery of valve 10 is axially applied against washer 11,
and, for another angular position offset by 90° from the preceding one (position shown in FIG. 2 and with broken lines in FIG. 3), it comes into contact with the valve at most at the times when this latter is subjected to its movements of maximum amplitude.

Cam 13 is secured to a rod 14 with axis Y which passes through ring 1 through a seal 15. Rod 14 ends, externally of the support, in a head 16 adapted for being driven in rotation.

In the drawings, this head 16 is a bolt head formed with a diametrical slit 17.

But it may also be formed by an element coupled to an appropriate drive member such as a small electric motor or similar whose energization is itself made dependent on the appearance of a phenomenon making blocking of the valve desirable or not.

Thus, in an advantageous embodiment, and so as to avoid "clacking" of the valve during stopping and starting of the engine, means may be provided for blocking the valve on the one hand for a time $T_0$ following each start up of the engine and, on the other, for a $T_1$ preceding each stopping of this engine. These times $T_1$ and $T_0$ for example of the order of a second.

It should be further noted that between the two endmost angular positions of cam 13 corresponding respectively to total blocking and maximum unblocking of valve 10, there exists an indefinite number of intermediate positions corresponding to different values for the allowed amplitudes of the movements of the valve.

In the preferred embodiment illustrated, a second restricted passage 18 has been provided in parallel with the first one 9. Passage 18 is formed by a short rectilinear channel of relatively large section in the dividing wall 8 parallel to axis X.

More precisely, channel 18 is formed in a rotary cylindrical member 19 itself placed in a complementary housing member 19 forms a "valve body" provided in dividing wall 8 and this member is secured to rod 14.

The result of such securing is that the rotary controls of cam 13 and those of member 19 are simultaneous, thus, the assembly is provided so that total blocking of valve 8 corresponds to total opening of channel 18, and maximum unblocking of valve 10 corresponds on the contrary to total closure of channel 18.

For the angular positions of this rotary assembly between these two endmost positions, partial opening only of channel 18 can be observed, combined with only partial blocking of the valve, i.e. a simple limitation of the amplitude of free movement of the latter.

This progressivity makes it possible to move continuously the value of said frequency, which corresponds to maximum damping, within the range of frequencies of the oscillations imposed on the support considered.

Thus, said value may be very small and of the order of 5 Hz only, when the second column 18 is totally closed and relatively high, namely of the order of 25 to 30 Hz, when this second column is totally freed.

An advantageous application of such coupling is the one, mentioned above, in which the valve must be blocked for a time $T_0$ after each beginning of starting the engine and for a time $T_1$ before each stopping of this engine.

In fact, during the periods considered, it is advisable for the support to be adapted so as to damp the vibrations which are generated by the engine of the idling vehicle, on stopping of this vehicle. It is precisely to such a speed that, in the above numerical example, total opening of the second channel corresponds, synchronized with blocking of the valve.

Following which and whatever the embodiment adopted, an antivibratory support is finally obtained whose construction, operation and advantages follow sufficiently from the foregoing.

As is evident and as it follows moreover already from what has gone before, the invention is in no wise limited to those of its modes of application and embodiments which have been more especially considered; it embraces, on the contrary, all variants thereof, particularly those in which the above valve is replaced by the central portion of a deformable membrane connected sealingly to the rigid remainder of the intermediate dividing wall 8.

I claim:

1. An antivibratory device which is disposed between two rigid elements for support and damping purposes comprising:
    a sealed case including
    (a) a rigid base (4) fixable to one of the rigid elements,
    (b) a rigid ring (1) fixable to the other rigid element,
    (c) a resilient annular supporting wall (6) sealingly connecting said base to said ring, and
    (d) a flexible membrane (7) connected sealingly to said ring whereby an inside of said case is formed between said annular supporting wall and said flexible membrane; an intermediate dividing wall (8) dividing the inside into a work chamber (A) adjacent said annular supporting wall and a compensation chamber (B) adjacent said membrane, said dividing wall including a movable valve portion (10) which is movable along an axis of movement;
    a restricted passage (9) which forms a permanent communication between said chambers;
    a liquid mass (12) which fills said chambers and said restricted passage;
    a first stop means (11) for restricting the movement of said movable valve portion in one direction along the axis of movement thereof; and
    a second stop means for restricting the movement of said movable valve portion in an opposite direction along the axis of movement thereof whereby said movable valve portion is restricted to an amplitude of movement by said first and second stop means, said second stop means including
    (a) a rotary cam (13) immersed in the liquid in one of said chambers adjacent said movable valve portion and having an offcenter axis of rotation which is oriented in a direction perpendicular to the axis of movement of said movable valve portion whereby an angular position of said rotary cam determines an allowable amplitude of movement of said movable valve portion from a minimum valve to a maximum valve, and
    (b) a rod (14) coupled to said rotary cam and passing through a seal in a wall of the one said chamber in which said rotary cam is provided, whereby a rotation of said rod causes a rotation of said rotary cam and a variation in the allowable amplitude of movement of said movable valve portion.

2. An antivibratory device as claimed in claim 1 wherein said rotary cam is immersed in said work chamber.

3. An antivibratory device as claimed in claim 1 wherein said rotary cam is a cylinder having a center axial axis offset from the axis of rotation of said rotary cam.

4. An antivibratory device as claimed in claim 1 wherein said intermediate dividing wall includes a rigid annular seat for said movable valve portion; and further including
    (a) a second restricted passage which also forms a communication between said chamber, and
    (b) a rotary member which is coupled to said rotary cam for rotary movement therewith to adjustably block communication between said chambers through said second restricted passage whereby said second restricted passage is most blocked when the amplitude of movement of said movable valve portion is at the maximum value and is most unblocked when the amplitude of movement of said movable valve portion is at the minimum value.

* * * * *